United States Patent [19]

Scott

[11] Patent Number: 4,881,153
[45] Date of Patent: Nov. 14, 1989

[54] VEHICLE WHEEL LIGHTING SYSTEM

[75] Inventor: Russell E. Scott, Salt Lake City, Utah

[73] Assignee: David Duane Scott, Draper, Utah

[21] Appl. No.: 297,400

[22] Filed: Jan. 17, 1989

[51] Int. Cl.$^4$ ............................................. B60Q 1/00
[52] U.S. Cl. ..................................... 362/78; 439/16; 439/22
[58] Field of Search ...................... 362/61, 78; 439/13, 439/16, 18, 22, 27

[56] References Cited

U.S. PATENT DOCUMENTS

| | | | |
|---|---|---|---|
| 1,539,394 | 5/1925 | Leeman | 362/78 |
| 1,643,593 | 9/1927 | Styer et al. | 362/78 |
| 2,083,514 | 6/1937 | Brown | 362/78 |
| 2,526,548 | 10/1950 | Franklin | 362/78 |
| 3,016,079 | 1/1962 | Weller | 152/218 |
| 3,099,401 | 7/1963 | Bell | 362/78 |
| 3,113,727 | 12/1963 | Bradway | 362/78 |
| 3,389,937 | 6/1968 | Brumfield | 301/37 CD |
| 4,381,537 | 4/1983 | Hinrichs | 362/78 |

Primary Examiner—Ira S, Lazarus
Assistant Examiner—Richard R. Cole
Attorney, Agent, or Firm—Thorpe, North & Western

[57] ABSTRACT

The invention relates to a lighting system for vehicle wheels and comprises a disk assembly which facilitates the electrical attachment of a rotating light with a stationary electrical power source of a vehicle. Further, the invention includes a mounting system for mounting a disk to the lugs of the vehicle on the inside of the wheel. The disk comprises first and second coaxially mounted electrically conductive rings which remain in continuous electrical contact when rotated relative to each other. The mounting system includes an electrically conductive portion and an insulator portion which electrically separates the mounting assembly from the first and second rings; the electrically conductive portion of the mounting means being used to electrically ground the rotating lights.

14 Claims, 6 Drawing Sheets

VEHICLE WHEEL LIGHTING SYSTEM

BACKGROUND OF THE INVENTION

1. Field of the Invention

This invention relates to a wheel lighting system and more particularly to a disk and light assembly which is attachable to the lugs of a vehicle wheel.

2. Description of the Prior Art

Novelty vehicle lighting items have become very popular because of their ability to enhance the appearance of vehicles. In the past, lights were attached to vehicles only for purposes of visibility enhancement and safety. But now, lights are also used on vehicles for convenience and aesthetic purposes. For example, lights are now used as door lights, interior mirror lights, reading lights, etc.

It has long been a desire to illuminate the wheels of vehicles to enhance their aesthetic appeal, yet to date, a simple and reliable lighting apparatus has not been developed. There has been a desire for a wheel lighting apparatus wherein a plurality of lights could be positioned behind the wheel of a vehicle in such a manner that the lights would receive their power from the nonrotating vehicle, but still while the wheel rotated. A desirable feature of such a system would allow the vehicle owner to orient the lights as he chooses, i.e., to customize the placement of the lights to accommodate the particular type of wheel used on the vehicle.

Styer et al., U.S. Pat. No. 1,643,593, discloses a wheel mounted light which rotates with the wheel. Styer's device also includes a ring, which when used in conjunction with a brush, allows for the transfer of electrical current from the nonrotating vehicle to the rotating light.

Bradway, U.S. Pat. No. 3,113,727, discloses another wheel illumination device in which lights are electrically connected to the automobile power source by means of wires connected to a complicated lug bolt and spring tensioned brush system.

Hinricks U.S. Pat. No. 4,381,537, discloses a wheel illumination device which is not attached directly to the wheel and so no system for transferring electricl current from the nonrotating automobile power source to the rotating wheel is disclosed.

None of these prior art references discloses a ring system which completely incorporates all the structure required to transfer electrical current from a nonrotating vehicle power source to a rotating wheel light.

SUMMARY OF THE INVENTION

It is a principal object of the present invention to provide an electrical lighting system for vehicle wheels which is usable on nearly any type of wheel. It is also an object of the invention to provide such a system which may be readily mounted on and dismounted from vehicles and vehicle wheels.

It is a further object of the invention to provide such a system which is constructed to minimize the chance of dirt or grit from reaching and damaging system parts.

The above and other objects of the invention are realized in a specific illustrative embodiment of a disk assembly and light assembly for use on a vehicle wheel having a hub and lug bolt system of wheel attachment. The disk assembly includes a mounting plate for mounting to the wheel hub, where the plate has mounting holes capable of matching with any lug bolt vehicle hub design. The assembly also includes a brush ring and a face ring which rotate relative to each other when the wheel is rotated relative to the vehicle. The disk assembly further includes an insulator to which the mounting plate, face ring and brush ring are assembled and which provides electrical separation of the face ring and brush ring from the mounting plate by being positioned therebetween, and a connector plate, which is attached to the mounting plate and provides means for connection of the light assemblies thereto. The insulator prevents the brush and face rings from electrically shorting with the mounting plate or any other part of the vehicle.

The light assembly includes a light bulb and bracket arrangement having a colored lens and a reflector plate. The light assembly further includes a lens stem which attaches the light to the connector plate of the disk assembly at any position around the disk perimeter. The lens stem is bendable so as to allow positioning of the light to illuminate the openings in any wheel design. The light is electrically connected on its positive side to the face ring of the disk and on its negative side to the mounting plate via the light reflector and the lens stem.

Any number of light assemblies may be used to obtain the desired illumination of the wheel. The mounting plate of the disk can be attached to any common type of vehicle wheel including four or five lug bolt designs as well as disk or drum braking systems.

DETAILED DESCRIPTION OF THE INVENTION

Figure 1:
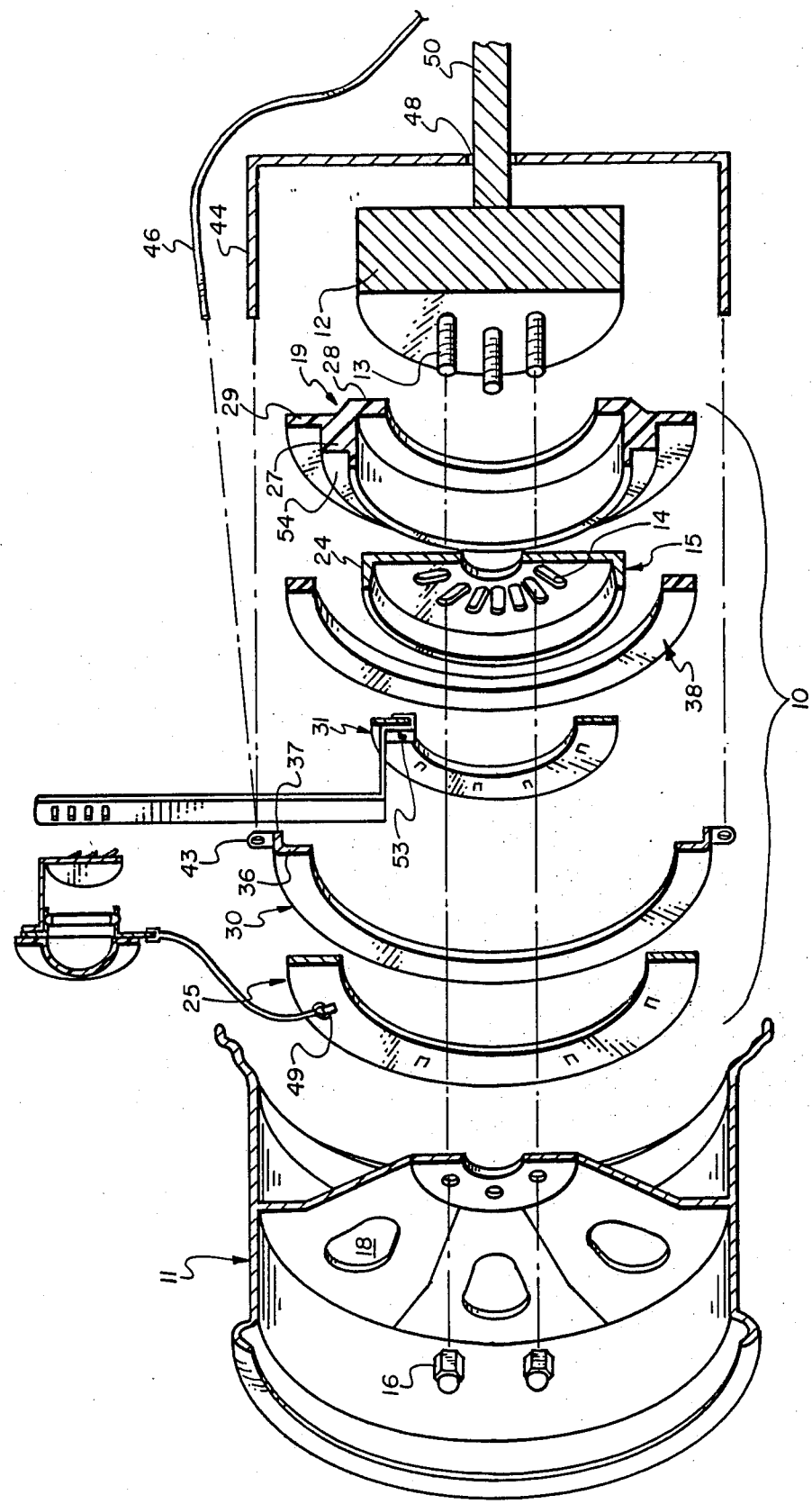
FIG. 1 is a partially cut away, exploded, perspective view of the disk assembly of the wheel lighting system of the present invention showing how it would be mounted on a wheel and hub.

FIG. 1 shows one illustrative embodiment of the present invention oriented for attachment between a wheel 11 and a hub 12 of a conventional vehicle. The two major parts of the vehicle wheel lighting apparatus include a disk assembly 10 and light assemblies 20. The disk assembly 10 attaches to the vehicle hub 12, and allows electrical current to pass from the stationary (nonrotating) vehicle, to the rotating assembly. Any number of light assemblies 20 can thereafter be attached to the disk assembly 10 at any location which will create the desired illumination of the wheel.

Figure 2:
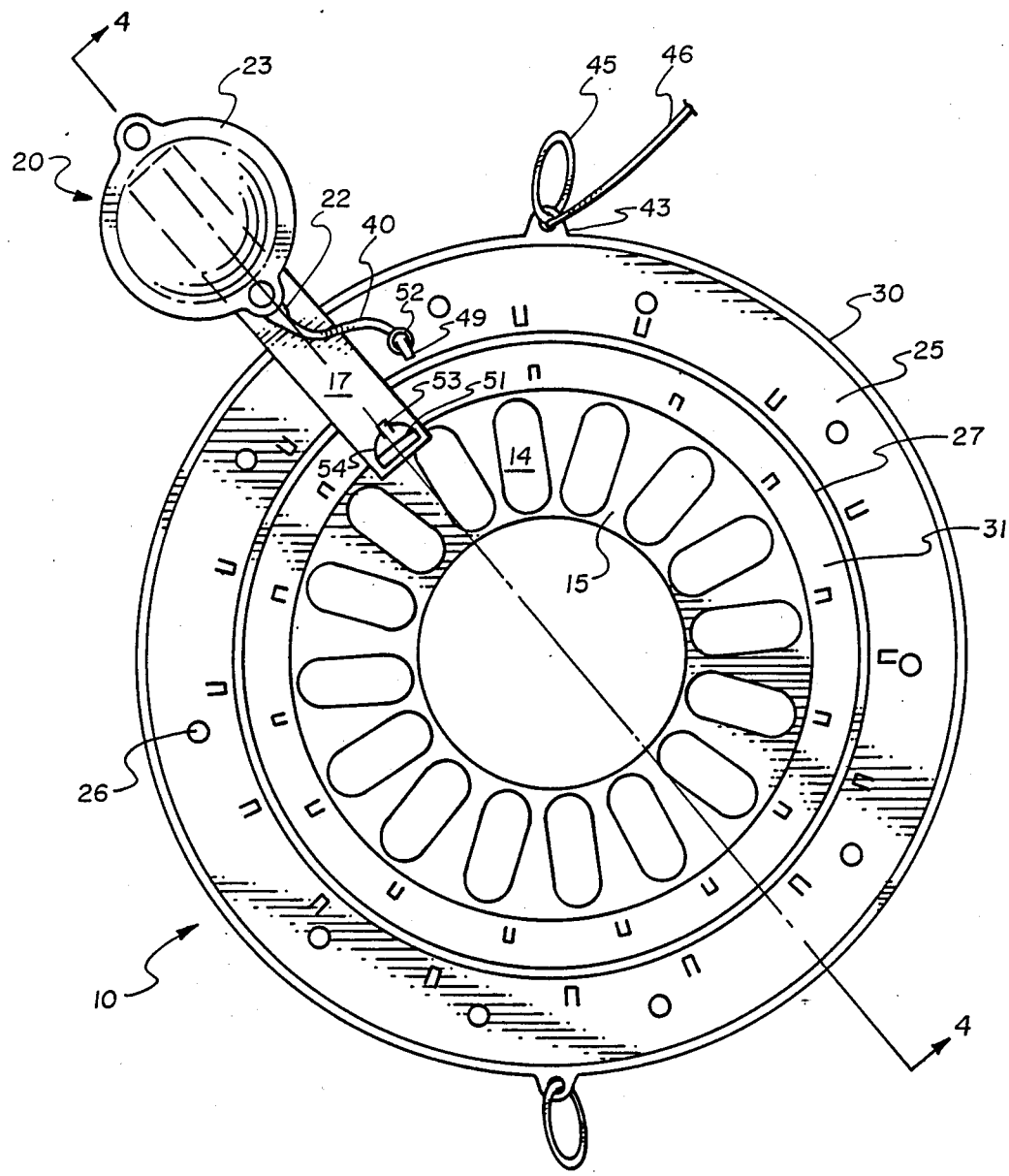
FIG. 2 is a front view of the disk assembly and an attached light assembly of the invention.

Moving now to a more complete description of the disk assembly 10, FIG. 2 shows the face of the disk assembly 10 which is located adjacent the wheel 11 when attached. The disk assembly is a combination of several ring shaped elements including a face ring 25, a brush ring 30, a buffer ring 38, an insulator 19, a mounting plate 15, and a connector plate 31.

The insulator 19 of the disk assembly 10 has two main functions. First, it electrically separates the face ring 25 and brush ring 30, from the mounting plate 15 and connector plate 31. Secondly, it provides the necessary surfaces to which all other elements of the disk assembly are mounted.

The mounting plate 15 is used to attach the disk assembly to the hub of a vehicle. It contains holes 14 which are arranged in a circular pattern such that they can match up with and allow to pass through, any standard arrangement such as a four or five lug bolt type vehicle hub.

The electrically conductive face ring 25 has its interior surface in rotatable electrical contact with an adjacent surface of electrically conductive brush ring 30. Face ring 25 contains tabs 49 which are spaced completely around its exterior surface to allow electrical attachment of the light terminal wire 40 in a manner which will later be described. Brush ring 30 also includes axle bracket loops 43 which allow an axle bracket 44 to be attached thereto in order to prevent its rotation relative to the vehicle. Axle bracket 44 is attachable to the axle bracket loops 43 by means of ties 45 or the like. Axle bracket loops 43 are also used to attach a source of electrical current such as wire 46 to the brush ring 30. Wire 46 is threadedly attached to the loop 43 thus electrically connecting the brush ring 30 to the vehicle's electrical power source (not shown). Since the brush ring 30 is in continuous rotatable electrical contact with face ring 25, electrical current can pass to face ring 25 even when the face ring 25 is rotating relative to the brush ring 30.

Light assembly 20 comprises a bulb 35, a set of brackets 41 and 42, a lens 23, a reflector 33, and a lens stem 17. As previously stated, the light assembly 20 is secured against movement relative to the disk assembly 10 by means of the lens stem 17.

The reflector 33 is attached to the lens 23 and bracket 41 at one of its ends by means of a rivet or the like. The opposite end of reflector 33 is generally circular and located behind the bulb 35 such that it will reflect light through the lens 23. This circular end of the reflector 33 contains tabs 34 which can be fastened by cutting portions of the reflector in a generally semi-circular pattern and then bending the semi-circular portion away from the surrounding material.

Lens stem 17 is a long, thin, bendable, and electrically conductive strip of material which contains holes 47 at one end for attachment with the reflector 33 of the light assembly 20, and connector tab 51 at its other end for attachment with the connector plate 31 of disk assembly 10.

The lens stem 17 is attached to the reflector 33 by means of reflector tabs 34 being inserted through stem slots 47. Then the tab 51 of the lens stem 17 is attached to the connector plate 31. When thus positioned, tab 51 is in contact with electrically conductive mounting plate 15. When the mounting plate 15 is attached to the lug bolts 13 of the vehicle, an electrical path is created which electrically grounds the negative side of light assembly 20.

The light assembly 20 attaches to the face ring 25 by means of terminal wire 40. The terminal wire 40 has a snap fit end 22 which snaps to the bracket 42, and a terminal loop end 52 which loops over face ring tab 49. When thus assembled, electrical current can pass from the face ring 25 to the light bulb 35 through the terminal wire 40.

It should be noted here that ridge 27 of the insulator ring 19, insulates the mounting plate 15 from the electrically conductive rings 25 and 30 to prevent the current supplied to the brush ring 30 from shorting across to the mounting plate 15 and disabling the light assembly 20.

Figure 3:
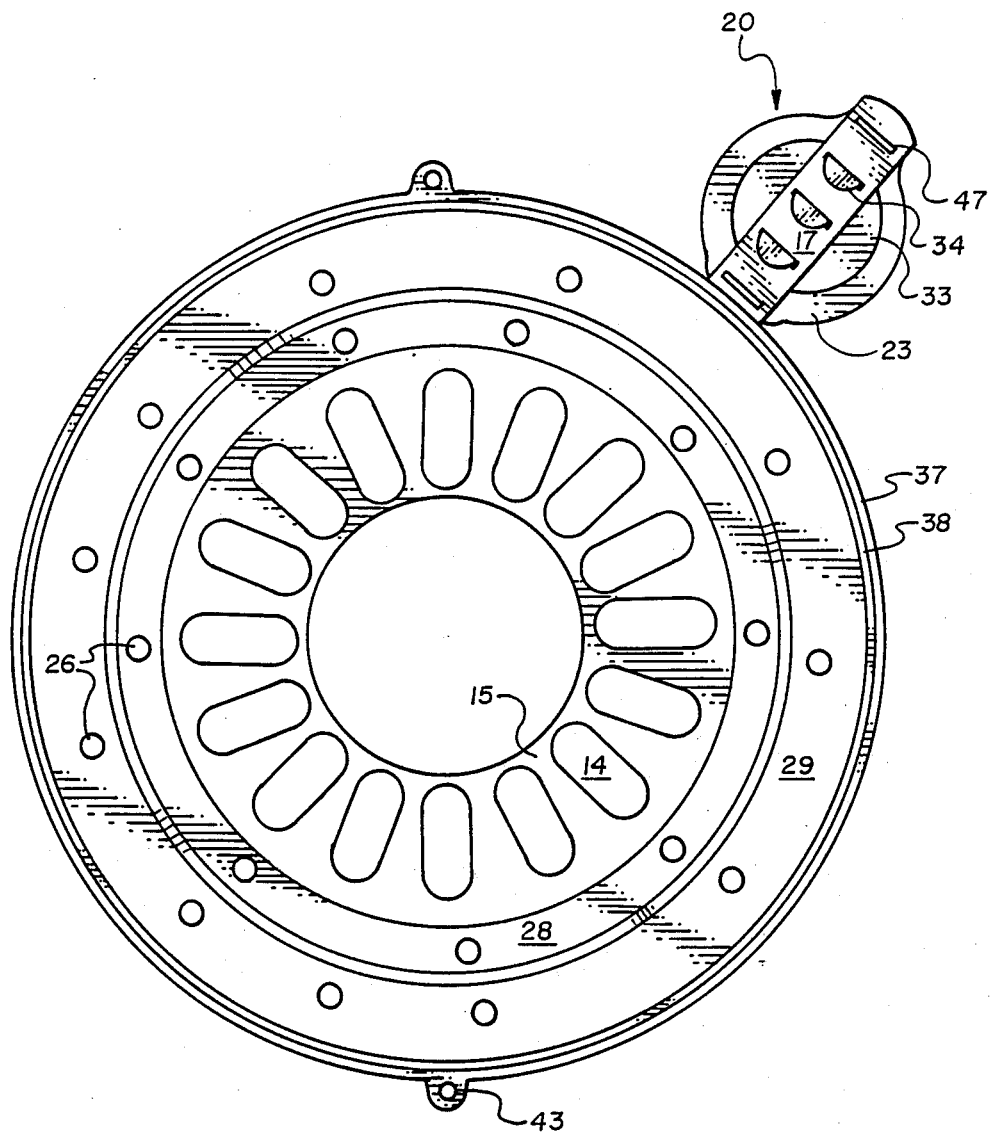
FIG. 3 is a rear view of the disk assembly and attached light assembly.

FIG. 3 shows the reverse side of the disk assembly 10 which attaches adjacent the hub 12 of the vehicle. As best seen in FIG. 3, the insulator also has a radially extending portion 29, notch portion 54 and a mounting extension 28. Mounting extension 28 and notch portion 54 of insulator ring 19, are shown to securely hold the mounting plate 15 and the face ring 25 respectively by means of rivets 26 or the like.

Figure 4:
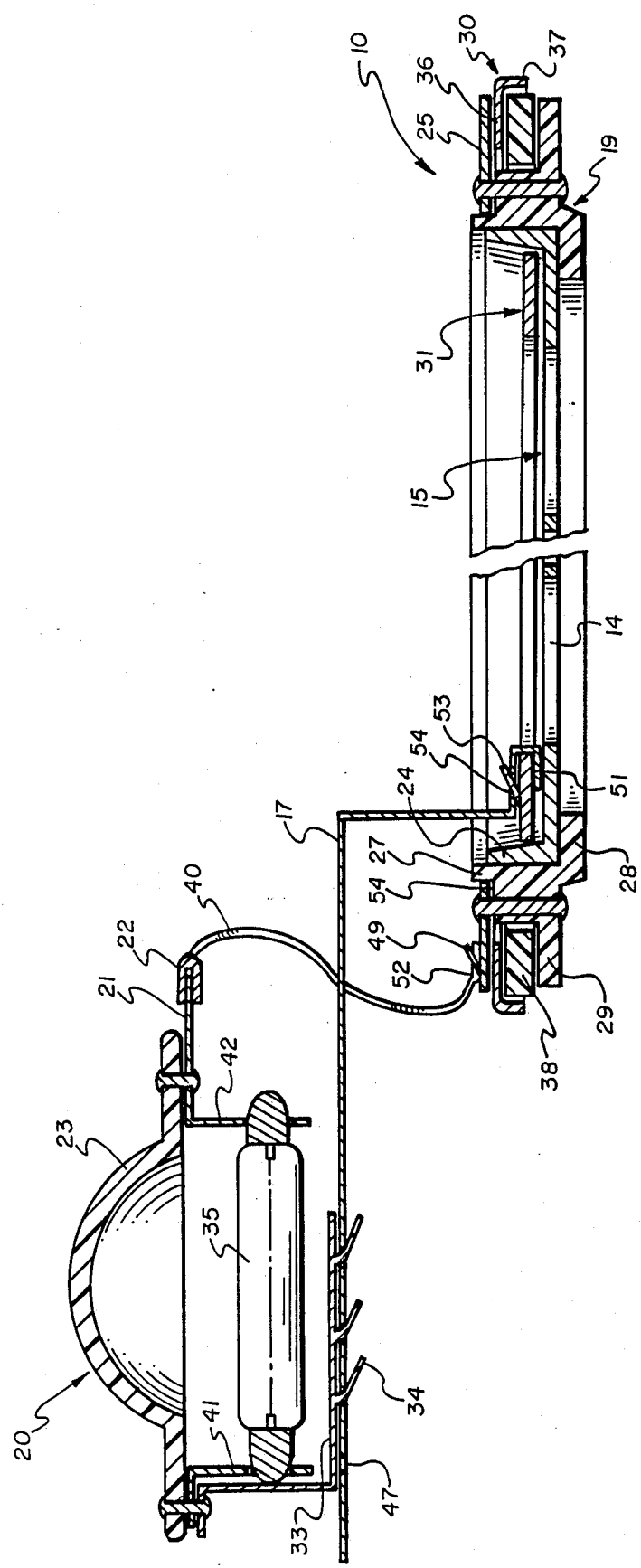
FIG. 4 is a cross-sectional view of the lighting system of FIG. 2 taken along lines 4—4.
Figure 5:
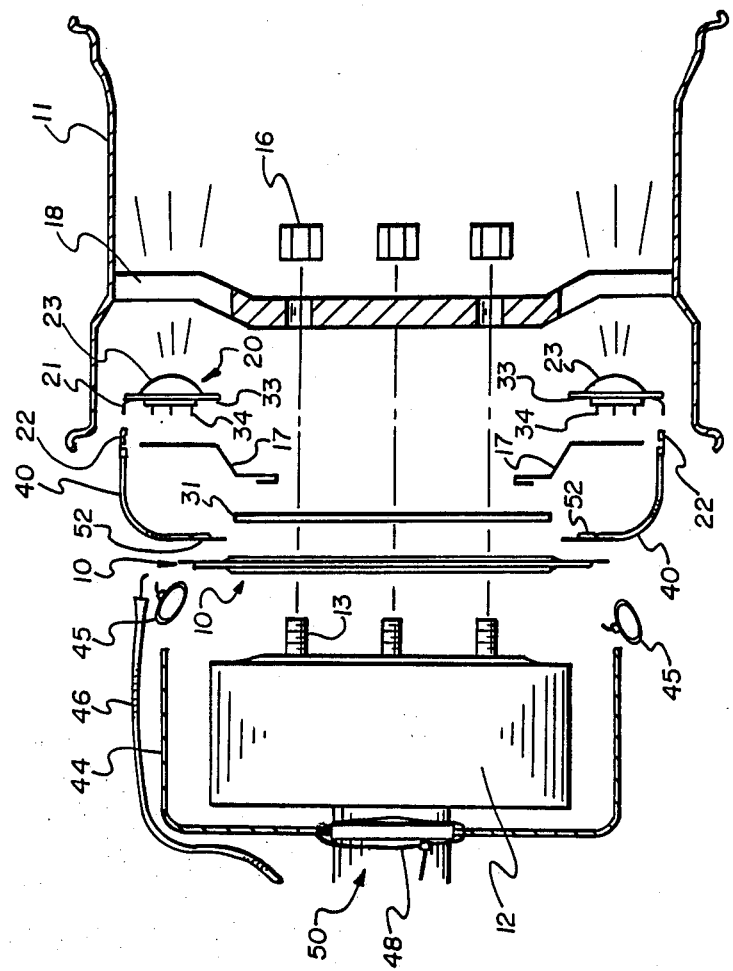
FIG. 5 is a side, exploded, view of the light system oriented for mounting on an automobile brake drum.

Further, as best shown in FIGS. 2 and 4, mounting plate 15 also is attached to the stem connector plate 31 by rivets 26 in a like manner. Although the stem connection plate 31 is rigidly riveted to the mounting plate 15, there is sufficient spacing to allow for a plurality of the connector tabs 51 of lens stem 17 to be forced in between their adjacent surfaces at various locations around the disk. Stem connector plate tabs 53 are located such that they extend through openings 54 in the lens stem 17 to hold it in place and prevent its removal. Ridge 27 of insulator 19 abuts with mounting plate ridge 24 and prevents the mounting plate from any electrical contact with the remainder of the disk assembly 10.

Electrically conductive face ring 25 is attached to the notch portion 54 of the insulator 19 in such a manner as to create a toroidal-shaped brush track 32 in which electrically conductive brush ring 30 can rest as the remainder of the disk assembly 10 rotates with the wheel 11. Brush ring 30 comprises a contacting portion 36 and retaining portion 37. Contacting portion 36 electrically joins with the interior surface of the face ring 25 such that electrical current can pass from the brush ring contacting portion 36 to the face ring 25, even when it is rotating relative to the brush ring 30. To insure continuous contact between the brush ring 30 and the face ring 25, yet prevent excessive friction, noise and wear, a buffer ring 38 is located in the brush track 32 between the radially extending portion 29 of the insulator 19, and the brush ring 30. The buffer ring 38 freely "floats" in the brush track 32 and is prevented from misorientating itself during rotation by the brush ring retaining portion 37. The buffer ring 38 prevents excessive friction and noise by preventing the brush ring from contacting the insulator 19 at the bottom of the brush track 32.

Figure 6:
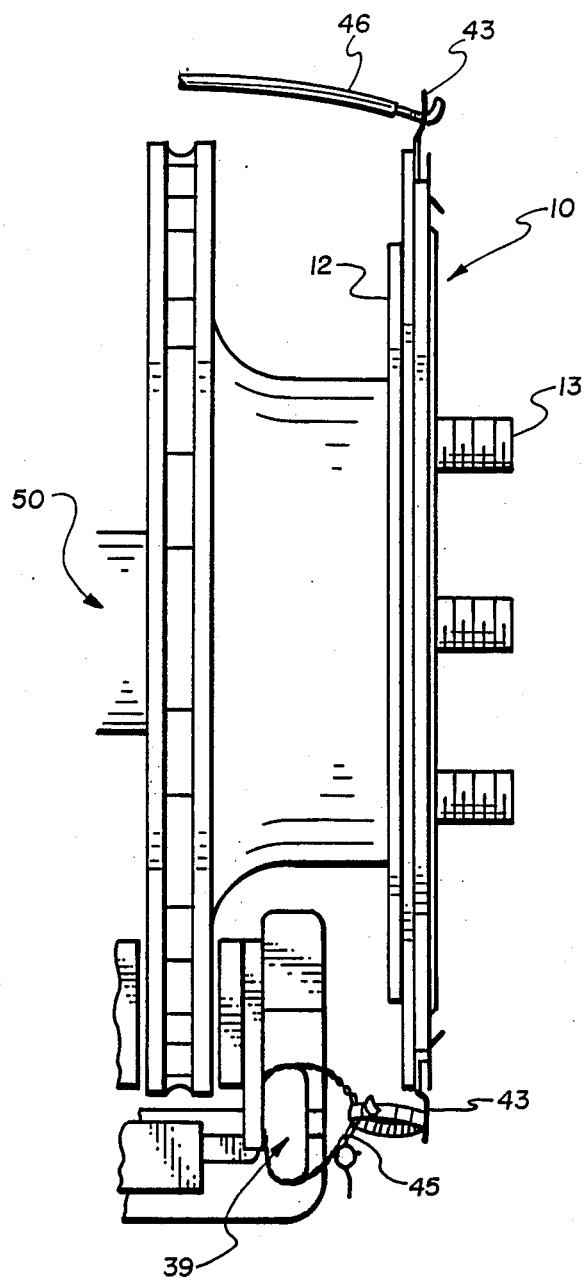
FIG. 6 is a side view of the disk portion of the invention mounted to a disk brake system.

FIG. 6 shows a modification of the invention when it is desired to attach it to a vehicle wheel which uses a disk type braking system. Instead of using the ties 45 to attach the axle bracket loop 43 to the axle bracket 44, a tie 45 is used to attach an axle bracket loop 43 to any nonrotating portion of the brake calliper assembly 39. In this type of installation, the axle bracket 44 need not be used.

As explained above, any number of light assemblies 20 may be connected about the disk assembly 10 to effect the desired lighting of the vehicle wheel 11. Reflector 33 is connected to the ground side of the light bulb 35 through bulb bracket 41. The bulb bracket 42, connected to the positive or hot side of the bulb 35, comprises electrical terminal 21 which is connectable with the snap fit end 22 of the terminal wire 40. The opposite end of terminal wire 40 comprises terminal loop 52 which can be attached to any one of the face ring tabs 49. With the terminal wire thus connected, electrical current can pass from the face ring 25 to the light bulb 35.

The light assembly further comprises a lens 23 which can be of any desired shape or color, and which covers the bulb 35 on the wheel side when installed between the wheel 11 and hub 12.

The insulator 19 can be made of any rigid nonconductive material such as fiberglass or nylon. The buffer ring 38 can be made of any wear resistant material such as nylon, teflon or fiberglass. The brush ring 30, face ring 25 and mounting ring 15 can be made of any electrically conductive material such as stainless steel.

To install the lighting system on a vehicle, the disk assembly 10 is placed onto the hub 12 by inserting the lug bolts 13 through mounting holes 14 in the mounting plate 15. The axle bracket 44 is attached to the axle bracket loops 43 on the brush ring 30 by means of ties 45. The axle bracket 44 is then secured to the vehicle axle 50 by means of a larger tie 48.

If the lighting system is to be attached to a vehicle wheel having disk brakes as shown in FIG. 6, the axle bracket is not used. Istead the axle bracket loop 43 of the brush ring 30 is attached to a fixed portion of the calliper assembly 39 by means of a tie 45. Either method fixes the brush ring 30 to the vehicle body in a nonrotating manner. The source of electrical current from the vehicle, represented as wire 46, is then also attached to one of the axle bracket loops 43. A desired number of lens stems 17 are attached to the stem connector plate 31 by pushing the connector tabs 51 between the stem connection plate 31 and the mounting plate 15 such that the connector tabs 51 are forced into electrical contact with the mounting plate 15 as best shown in FIG. 4. Stem connector tab 53 is bent over the lens stem 17 to prevent its removal once in place.

Next, the reflector tabs 34 are inserted through the desired slots 47 in the lens stem 17 and secured by clamping the tabs against the back of the lens stem. The terminal wire 40 is then snap-fitted to the electrical terminal 21 and the terminal loop 52 of the terminal wire 40 is placed over the face ring tab 49 and secured by clamping the tab securely around the terminal loop 52.

The wheel 11 is then inserted over the lug bolts 13 and the light assemblies 20 are adjusted so as to direct their light through the openings 18 in the wheel in the desired manner. Then, the wheel 11 is finally secured in place by means of lug nuts 16.

It is to be understood that the above-described embodiments and the description of installation are only illustrative of the application of the principles of the present invention. Numerous modifications and alternative embodiments may be devised by those skilled in the art without departing from the spirit and scope of the present invention and the appended claims are intended to cover such modifications and embodiments.

What I claim is:

1. A wheel lighting apparatus for mounting on a vehicle having at least one wheel which is rotatable with respect to a nonrotating portion of the vehicle, one wheel hub with lug bolts, and a source of electrical power, said apparatus comprising:
   disk means comprising
      an electrically conductive first ring which is rotatable with the wheel of the vehicle, and
      an electrically conductive second ring which is attachable to a nonrotating portion of the vehicle so as to be generally coaxial with said first ring and in continuous sliding electrical contact therewith as the wheel rotates,
   mounting means for attaching said first ring to a hub of the vehicle,
   light means attachable to said mounting means to rotate as the hub and wheel are rotated and responsive to electrical power for producing light, and
   means for electrically coupling said light means to said first ring so that electrical power supplied from the vehicle power source to said second ring is thereby supplied via said first ring to said light means.

2. A vehicle wheel lighting apparatus of claim 1 wherein said mounting means further comprises lug bolt openings uniformly spaced in a toroidal section of said mounting means, whereby said openings will mate with uniformly, toroidally spaced lug bolts on the vehicle.

3. A vehicle wheel lighting apparatus of claim 1 wherein said mounting means further comprises an insulator for electrically separating said mounting means from said first and second electrically conductive rings.

4. A vehicle wheel lighting apparatus of claim 3 wherein said disk means further comprises a means for buffering the friction created between said electrically conductive second ring and said insulator when said insulator rotates relative to said second ring.

5. A vehicle wheel lighting apparatus of claim 3 further including a plurality of said light means attachable to said mounting means whereby said light means rotates with the vehicle wheel when said mounting means is attached to the vehicle.

6. A vehicle wheel lighting apparatus of claim 5 wherein said light means further includes an electrical connector and said electrically conductive first ring further includes at least one tab means, in a surface opposite the surface contacting said second electrically conductive ring, for attaching said electrical connector thereto.

7. A vehicle wheel lighting apparatus of claim 5 wherein said light means further includes a thin, elongate lens stem means for attaching said light means to said mounting means.

8. A vehicle wheel lighting apparatus of claim 7 wherein said lens stem means further includes at least one slot located adjacent an end portion thereof and said light means further includes a generally circular reflector plate having at least one reflector tab located generally in the center thereof, whereby said at least one reflector tab can be passed through at least one of said lens stem slots and clamped securely to said lens stem means.

9. A vehicle wheel lighting apparatus of claim 7 wherein said lens stem means further includes a connector tab located in an end portion thereof remote from said slot for attaching said lens stem means to said mounting means.

10. A vehicle wheel lighting apparatus of claim 9 wherein said disk means further includes a connector plate attached to said mounting means and said connector tab is attachable to said connector plate such that it will contact said mounting means in such a manner that said connector tab and said mounting means function to electrically ground said light means.

11. A vehicle wheel lighting apparatus of claim 1 further including an axle bracket means for attaching to an axle of the vehicle, and said second electrically conductive ring further includes at least one axle bracket connection loop for connecting said axle bracket means thereto whereby when said axle bracket is attached to the axle of the vehicle and said axle bracket connection loop, said electrically conductive second ring remains stationary relative to the vehicle.

12. A vehicle wheel lighting apparatus of claim 11 wherein said at least one axle bracket connection loop also includes means for connecting a source of electrical current from the vehicle power source to said second electrically conductive ring.

13. A kit for a vehicle wheel light comprising:
 a disk means having a first electrically conductive ring coaxially arranged in rotational contact with a second electrically conductive ring,
 a mounting means attached to said disk means for attaching said disk means between a vehicle wheel and a hub,
 at least one light means which is attachable to said mounting means, and
 means for attaching said light means to said mounting means.

14. A kit according to claim 13 wherein said mounting means includes an electrically conductive portion and an insulator portion for electrically separating said electrically conductive portion from said first and second electrically conductive rings.

* * * * *